(12) United States Patent
Saban et al.

(10) Patent No.: US 8,700,565 B2
(45) Date of Patent: Apr. 15, 2014

(54) METHOD AND SYSTEM FOR DATA FILING SYSTEMS

(75) Inventors: David-Olivier Saban, Antibes (FR); Muriel Becker, Grasse (FR); Julien D'orso, Antibes (FR); Thierry Bassilana, Sartoux (FR)

(73) Assignee: Amadeus S.A.S., Sophia Antipolis (FR)

( * ) Notice: Subject to any disclaimer, the term of this patent is extended or adjusted under 35 U.S.C. 154(b) by 115 days.

(21) Appl. No.: 13/351,977

(22) Filed: Jan. 17, 2012

(65) Prior Publication Data

US 2013/0166501 A1    Jun. 27, 2013

(30) Foreign Application Priority Data

Dec. 22, 2011   (EP) .................................... 11306750

(51) Int. Cl.
*G06F 17/30* (2006.01)
*G06F 7/00* (2006.01)

(52) U.S. Cl.
USPC ........................................... 707/609; 707/638

(58) Field of Classification Search
USPC ......... 707/625, 681, 685, 602, 609, 624, 638, 707/736, 768, 999.2; 705/5, 6, 7.35, 80, 705/400; 726/1, 3
See application file for complete search history.

(56) References Cited

U.S. PATENT DOCUMENTS

| | | | |
|---|---|---|---|
| 6,668,261 B1 * | 12/2003 | Basso et al. ............................. | 1/1 |
| 7,383,463 B2 * | 6/2008 | Hayden et al. ................ | 714/4.11 |
| 7,769,722 B1 * | 8/2010 | Bergant et al. ................ | 707/681 |
| 7,840,587 B2 * | 11/2010 | Demarcken et al. .......... | 707/768 |
| 2002/0184060 A1 | 12/2002 | Schmitz et al. | |
| 2003/0131025 A1 * | 7/2003 | Zondervan et al. ........... | 707/200 |
| 2008/0270254 A1 | 10/2008 | Patoureaux et al. | |
| 2009/0063369 A1 * | 3/2009 | Brown et al. .................. | 705/412 |
| 2009/0234682 A1 | 9/2009 | Baggett et al. | |
| 2010/0057744 A1 * | 3/2010 | Lock et al. ...................... | 707/10 |
| 2010/0061599 A1 * | 3/2010 | Abe .............................. | 382/115 |
| 2010/0198628 A1 * | 8/2010 | Rayner ............................. | 705/6 |
| 2011/0093303 A1 * | 4/2011 | Isnardon et al. .................. | 705/5 |
| 2012/0185435 A1 * | 7/2012 | Misra et al. .................... | 707/638 |
| 2013/0046598 A1 * | 2/2013 | Roberts ....................... | 705/14.23 |

FOREIGN PATENT DOCUMENTS

WO    WO 99/08251    2/1999

* cited by examiner

*Primary Examiner* — Md I Uddin
(74) *Attorney, Agent, or Firm* — Wood, Herron & Evans, LLP

(57) ABSTRACT

A method for updating data to ensure the correct version of the data is available for a user of a second data system. In the second data system, an update request is received from a first data entity to update the data in a component of the second data system. The update request comprises an updated version of the data. The updated version of the data is compared with a currently stored version of the data in the second component to determine a change therein. An operating function representative of the change in the data is produced. The operating function is applied to the currently stored version of the standard data to produce resulting data. The operating function is stored to ensure the correct version of the data is capable of being output if requested.

21 Claims, 10 Drawing Sheets

METHOD AND SYSTEM FOR DATA FILING SYSTEMS

PRIORITY CLAIM

This application claims the benefit of European Patent Application No. 11306750.8, filed Dec. 22, 2011; the disclosure of which is incorporated herein by reference in its entirety.

FIELD OF THE INVENTION

The present invention relates to a method and system for facilitating the update of data related to data filing systems used in the travel industry.

BACKGROUND OF THE INVENTION

In the travel industry, data filing systems deal with the filing and the storing of data related to products such as travel and associated products and services. For example, filing systems provide pricing engines with such data for producing a specific fare for a specific trip.

Nowadays, two categories of data filing systems exist. Fare providers such as Airline Tariff Publishing Company (ATPCo) and Societe Internationale de Telecommunications Aeronautiques (SITA) provide a first category of data filing system called an institutional filing system. Each airline can send standard data related to standard products to the institutional filing system such as fares, rules and branded fares. Travel providers provide a second category of data filing system called a proprietary filing system. Some proprietary filing systems also receive standard data transmitted by the institutional filing system several times per day. The latest transmission of a given standard data relates to the current version of this standard data to be used by the proprietary filing system for producing an up to date airfare data related to standard products. In addition to the standard data, the proprietary filing system can also provide additional functionalities to allow airlines or travel agencies to add specific data to their standard data to extend the content of the corresponding standard product. Specific data may for instance relate to dynamic discounted fares or baggage.

However, in the current process, the airline must determine an efficient strategy for filing data. The airline can either exclusively use the institutional filing system to benefit from the wide data distribution system of the institutional filing system; or exclusively use the proprietary filing system to benefit from the additional functionalities and features of the proprietary filing system; or to use both institutional and proprietary filing systems which require filing the standard data twice. The standard data is not currently shared between the institutional filing system and the proprietary filing system. The airline must file the standard data a first time in the institutional filing system, and a second time in the proprietary filing system to benefit from any additional features.

This process has many inconveniences. To send duplicates of the standard data may give rise to errors when entering data in the proprietary filing system. In addition, sending duplicates may also cause an increasing amount of transmitted data on the corresponding transmission networks between airlines and proprietary filing systems. In addition, if airlines need to amend standard data, airlines have to process amendments in both the institutional filing system and the corresponding proprietary filing systems, which is highly time consuming.

OBJECTS OF THE INVENTION

It is an object of the present invention to overcome at least some of the problems associated with the prior art.

It is a further object of the present invention to provide a method and system for facilitating the update of data for data filing systems used in the travel industry.

SUMMARY OF THE INVENTION

The present invention provides a method and system for updating data, as described in the accompanying claims.

According to one aspect of the present invention there is provided a method for updating data to ensure the correct version of the data is available for a user of a second data system, wherein the data is capable of being stored in a first data entity and in a component of the second data system, wherein the method comprises in the second data system the steps of receiving via a computer an update request from the first data entity to update the data in the second component and wherein the update request comprises an updated version of the data for updating the data; comparing via a computer the updated version of the data with a currently stored version of the data in the second component to determine a change therein; producing via a computer an operating function representative of the change in the data; applying via a computer the operating function to the currently stored version of the standard data to produce a resulting data and storing via a computer the operating function having the change therein which represents the difference between the currently stored version of the data and the updated version of the data to ensure the correct version of the data is capable of being output if requested.

According to a second aspect of the present invention there is provided a system for updating data to ensure the correct version of the data is available for a user of a data system, wherein the data is capable of being stored in a component of the data system and wherein the system comprises: a request handling component for receiving an update request from a data entity and updating the data in the component wherein the update request comprises an updated version of the data for updating the data; an operating function component for comparing the updated version of the data with a currently stored version of the data in the component to determine a change therein; an operating function determination component for producing an operating function representative of the change in the data and a memory component for storing the operating function having the change therein to ensure the correct version of the data is capable of being output if requested.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
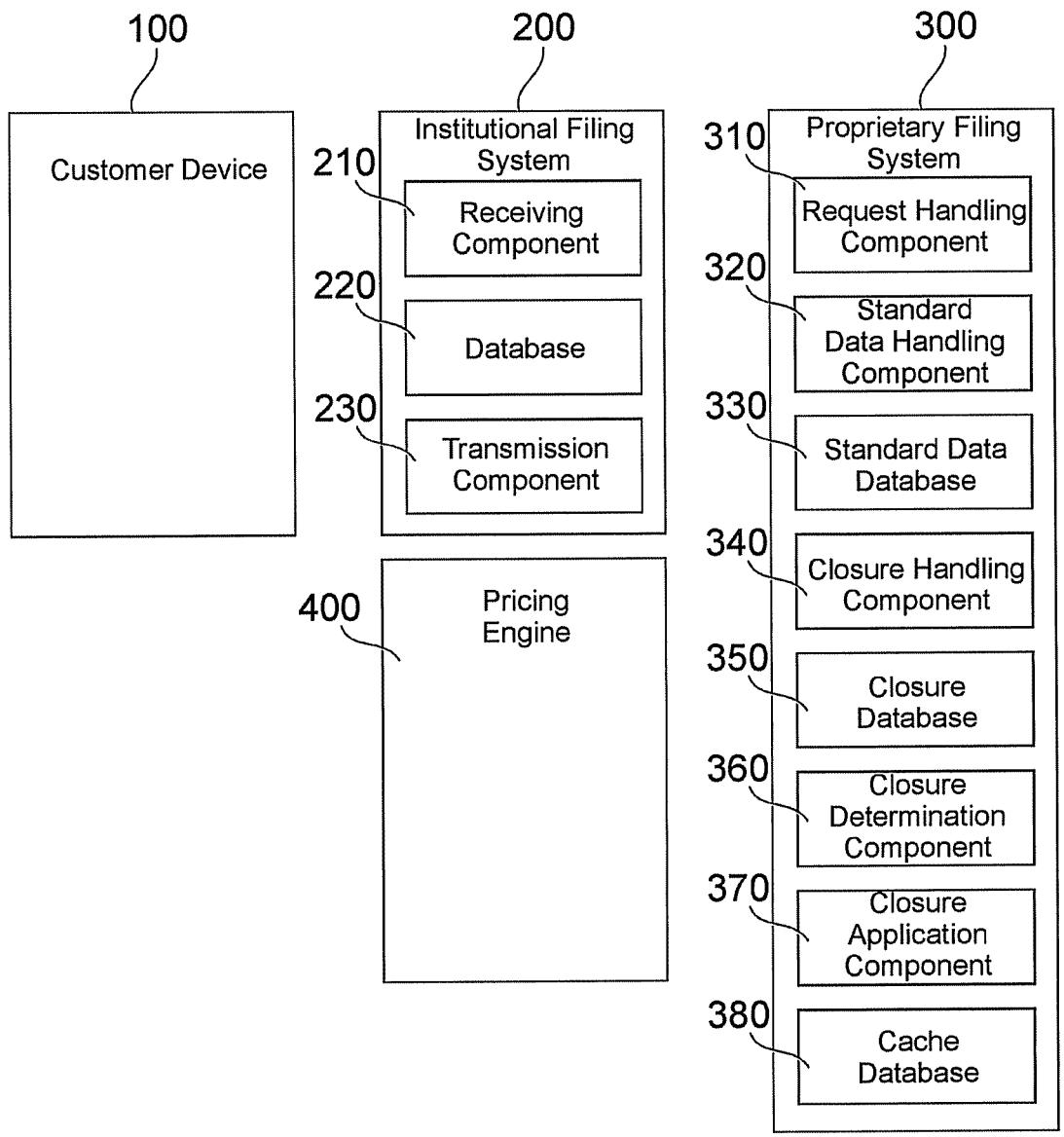
FIG. 1 is a schematic representation of a system, in accordance with an embodiment of the invention, given by way of example.

FIG. 1 shows a user device 100 relating to airlines for example. The user device 100 can be for example a personal computer, a laptop device or any other handheld device which is able to connect to a communication network such as the Internet. The user device 100 is connected to a first data system such as an institutional filing system 200 related to travel fare providers for example. The user device 100 is also connected to a second data system such as a proprietary filing system 300 related to a travel provider 300. The user can send requests to both the institutional filing system 200 and the proprietary filing system 300 through the user device 100.

The institutional filing system 200 comprises a receiving component 210 for receiving a request from the user. The request may comprise standard data to generate or updated versions of existing standard data. Standard data relates to standard travel products such as fares, rules and branded fares as provided by users. Standard data is valid during a predetermined duration of time, from an initial date to a final date. Standard data comprises a specific parameter such as a key having a first set of fields and corresponding values. A key represents the update/display granularity of a product. The corresponding values cannot be amended. Standard data also comprises one or more sequences comprising a second set of fields and corresponding values. The corresponding values can be amended through update requests. A sequence is always associated with a key. As a result, an update request always refers to both a key and a sequence. The institutional filing system 200 also comprises a first data entity such as a database 220 for storing standard data. The institutional filing system 200 regularly transmits the standard data to several proprietary filing systems such as the proprietary filing system 300 by means of a transmission component 230. The transmissions can occur several times per day. As a result, the institutional filing system 200 sends an updated version of a standard data to the proprietary filing system 300.

The proprietary filing system 300 comprises components operable in a computer environment. The components comprise a request handling component 310, a standard data handling component 320, a component such as a standard data database 330, a closure handling component 340, a closure database 350, a closure determination component 360, a closure application component 370, a memory component such as a cache database 380 and a graphical display interface (GUI).

The request handling component 310 can receive and process specific update requests or display requests from the user device 100.

A specific update request can relate to correction of a standard data already stored in the standard data database 330. In the situation of a correction of the standard data, the update request may require the removal or the amendment of standard values; or the removal of standard fields in a sequence.

Alternatively, the specific update request can relate to specific data to add to the standard data; or to amend in a previous version of a previously updated standard data. Specific data may relate to dynamic discounted fares, add-on zones or baggage for example. In this situation, the update request may require the addition of a specific field and the addition of a corresponding specific value in a sequence; or the amendment of a specific value previously added with a previous specific update request in a sequence. Specific data is valid during a predetermined duration of time, from an initial date to a final date. The request handling component 310 provides resulting data based on a standard update request; or on a specific update request.

The proprietary filing system 300 comprises a standard data handling component 320 for handling the standard data received from the request handling component 310. The proprietary filing system 300 also comprises a standard data database 330 to store standard data transmitted by the standard data handling component 320.

The proprietary filing system 300 comprises a closure handling component 340 to receive any request from the request handling component 310 regarding the existence of a closure associated with specific standard data. In the present description, the word closure relates to the information technology wording for defining objects carrying a function and corresponding parameters to apply to the function. The closure may be defined as an operating function. The proprietary filing system 300 comprises an operating function determination component such as the closure determination component 360 to process specific update requests to determine the function of the specific update and the nature of the data associated with each specific update request. The function can relate to an addition or an amendment of fields and values in a sequence. The nature of the data can relate to a field, a value of a field or both, in a sequence.

An operating function handling component such as the closure handling component 340 can send a request to the closure determination component 360 to produce a closure. The closure handling component 340 can transmit the created closure to an operating function component such as the closure database 350 to store the created closure. The request handling component 310 can transmit the created closure to an operating function application component such as the closure application component 370 to apply the created closure on the corresponding version of standard data. As a result, the closure application component 370 provides resulting data for a specific request.

The request handling component 310 can also determine which standard data from the standard data database 330 is associated with a specific update request within the proprietary filing system. The request handling component 310 sends a request to the standard data handling component 320. The standard data handling component 320 can then carry out a search in the standard data database 330 for retrieving the specific standard data. The request handling component 310 can also send a request to the closure handling component 340 to retrieve a closure associated with the retrieved standard data. The closure handling component 340 can then send a request to the closure database 350 to retrieve any stored closures associated with the standard data. Thus, the request handling component 310 retrieves the last stored standard data and the corresponding closure, if any.

The proprietary filing system 300 comprises a memory component such as a cache database 380 for storing the resulting data provided by the closure application component 370. This means that the cache database 380 only stores the last resulting version of data related to the standard data. Thus, the content of the cache database 380 does not increase each time an update request is processed.

The proprietary filing system 300 is connected to a pricing component such as a pricing engine 400. The pricing engine 400 can regularly request resulting data from the cache database 380 to provide fares when requested by users. As a result, the cache database 380 sends the resulting data to the pricing engine 400.

The method steps of the present invention will now be described with respect to several examples shown in FIGS. 2 to 8.

In the description below, the standard data is referred as data K to indicate that the standard data comprises a key K. In all examples below, all data comprise the same key K.

Figure 2:
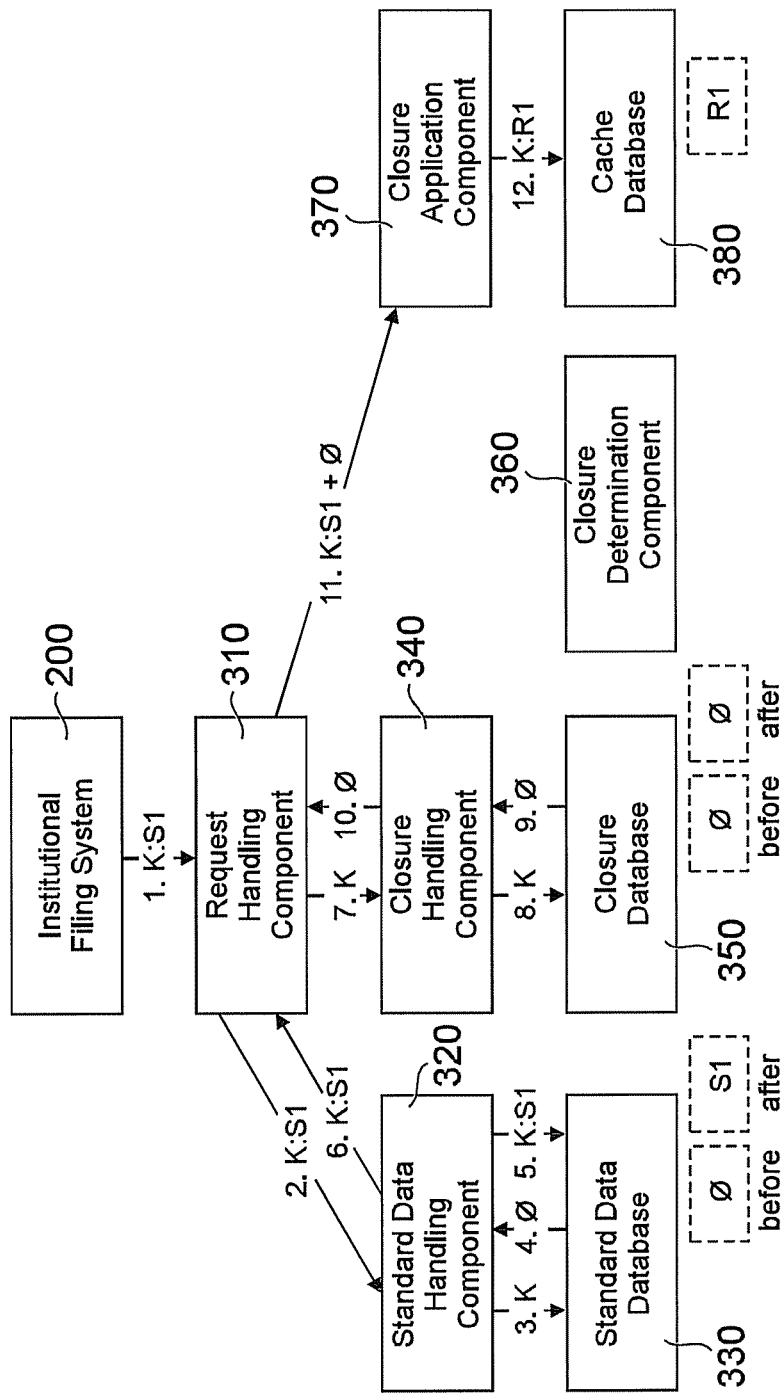
FIG. 2 is a schematic representation of a first example of the operations of the system of FIG. 1, in accordance with an embodiment of the invention, given by way of example.

FIG. 2 relates to an update of data K with a first version S1 from the institutional filing system 200. The user sends a request to the institutional filing system 200 for creating an update S1 comprising a sequence SQ1.

During a predetermined replication process, the transmission component 230 sends the update S1 to the request handling component 310 in step 1. The request handling component 310 transmits the update request to the standard data handling component 320 in step 2. The standard data handling component 320 carries out a search in the standard data database 330 of the proprietary filing system for retrieving any previously stored version of data having the same key K, i.e. a data K in the standard data database 330 in step 3. As S1 is the first standard version, the standard data component 320 does not find any other version for data K in step 4. The standard data component 320 then stores S1 in the standard data database 330 in step 5 as the first version of data K. The standard data handling component 320 returns the result S1 of the update request to the request handling component 310 in step 6. In step 7, the request handling component 310 sends a request to the closure handling component 340 to check if any closure is linked with the data K in the closure database 350 in step 8. As S1 is a brand new data, the closure handling component 340 does not retrieve any related closure in step 9. In step 10, the closure handling component 340 sends to the request handling component 310 the information regarding the absence of any closure. Finally, the request handling component 310 sends both the result of the update S1 received from the standard data handling component 320 and the result received from the closure handling component 340 to the closure application component 370 in step 11.

The closure application component 370 then applies any retrieved closure on the version S1 to create the resulting data R1. As no closure was retrieved, the resulting data R1 is identical to the standard version S1. The closure application component 370 transmits the resulting data R1 to the cache database 380 for storing the resulting data R1 as the only resulting data for data K in step 12.

Figure 3:
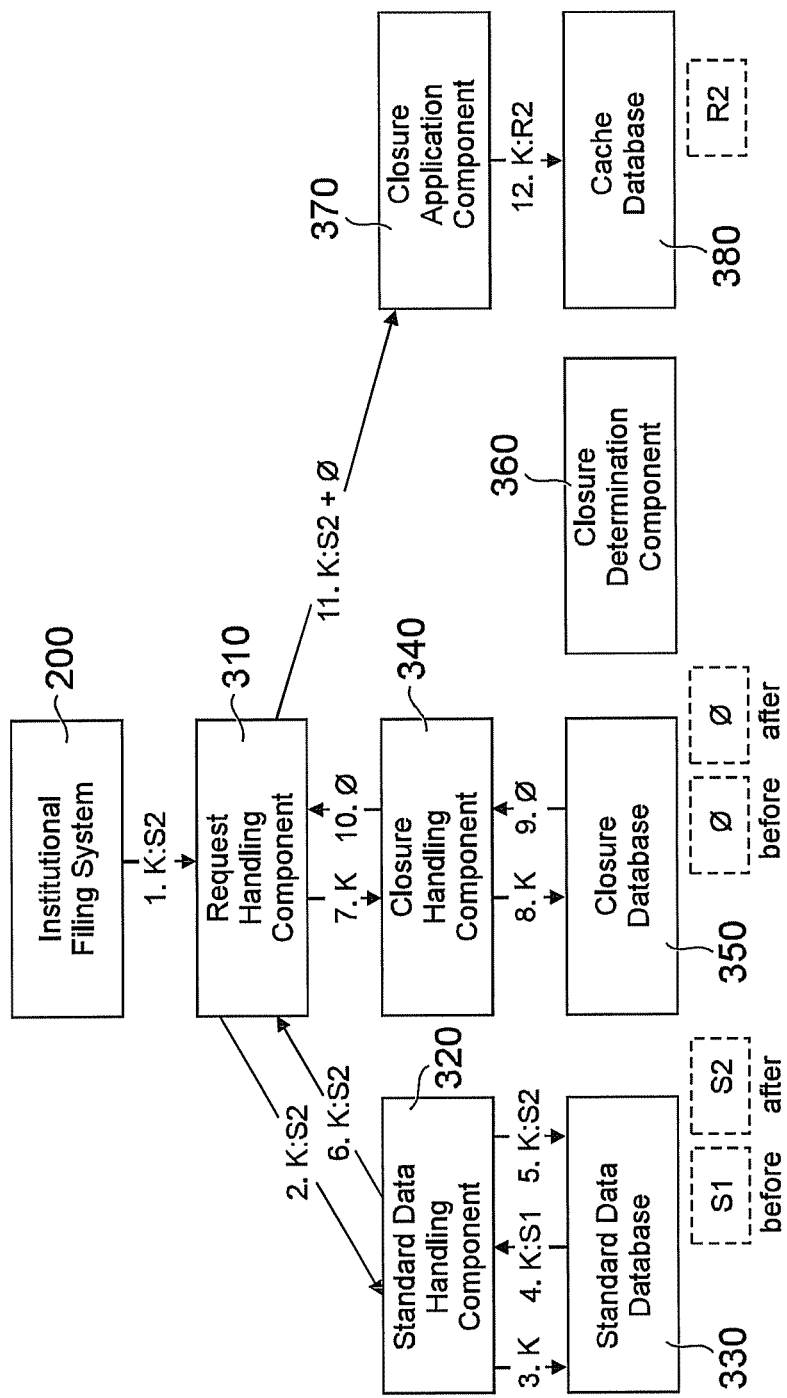
FIG. 3 is a schematic representation of a second example of the operations of the system of FIG. 1, in accordance with an embodiment of the invention, given by way of example.

FIG. 3 relates to an update of data K with a second version S2 from the institutional filing system 200. The user sends another request to the institutional filing system 200 for updating version S1 of data K. Thus, the user sends a second version S2, which comprises the same key K as S1 and an updated sequence SQ2 differing from SQ1. During the predetermined replication process, the transmission component 230 sends the second version S2 to the request handling component 310 in step 1. In step 2, the request handling component 310 transmits the update request to the standard data handling component 320. The standard data handling component 320 carries out a search in the standard data database 330 of the proprietary filing system 300 for retrieving any previously stored version of data K having the same key K as S2 in step 3. As S2 is an updated version of S1, the standard data handling component 320 retrieves the update S1 having the key K in step 4. The standard data handling component 320 stores S2 in the standard data database 330 in step 5 and returns the result S2 to the request handling component 310 in step 6. The request handling component 310 then sends a request to the closure handling component 340 in step 7. In step 8, the closure handling component 340 carries out a search in the closure database 350 to retrieve any stored closure associated with S1. In the present example, the request handling component 310 does not retrieve any stored closure in step 9. In step 10, the closure handling component 340 sends the information regarding the absence of any closure to the request handling component 310. Finally, in step 11the request handling component 310 sends both results received from the standard data handling component 320, i.e. S2 and from the closure handling component 340, i.e. no closure to the closure application component 370.

The closure application component 370 then applies any retrieved closure on the standard version S2 of data K to create the resulting data R2. As no closure was retrieved, the resulting data R2 is identical to the standard version S2. The closure application component 370 then transmits the resulting data R2 to the cache database 380 for storing the resulting data R2 as the only resulting data for data K in a step 12.

Figure 4:
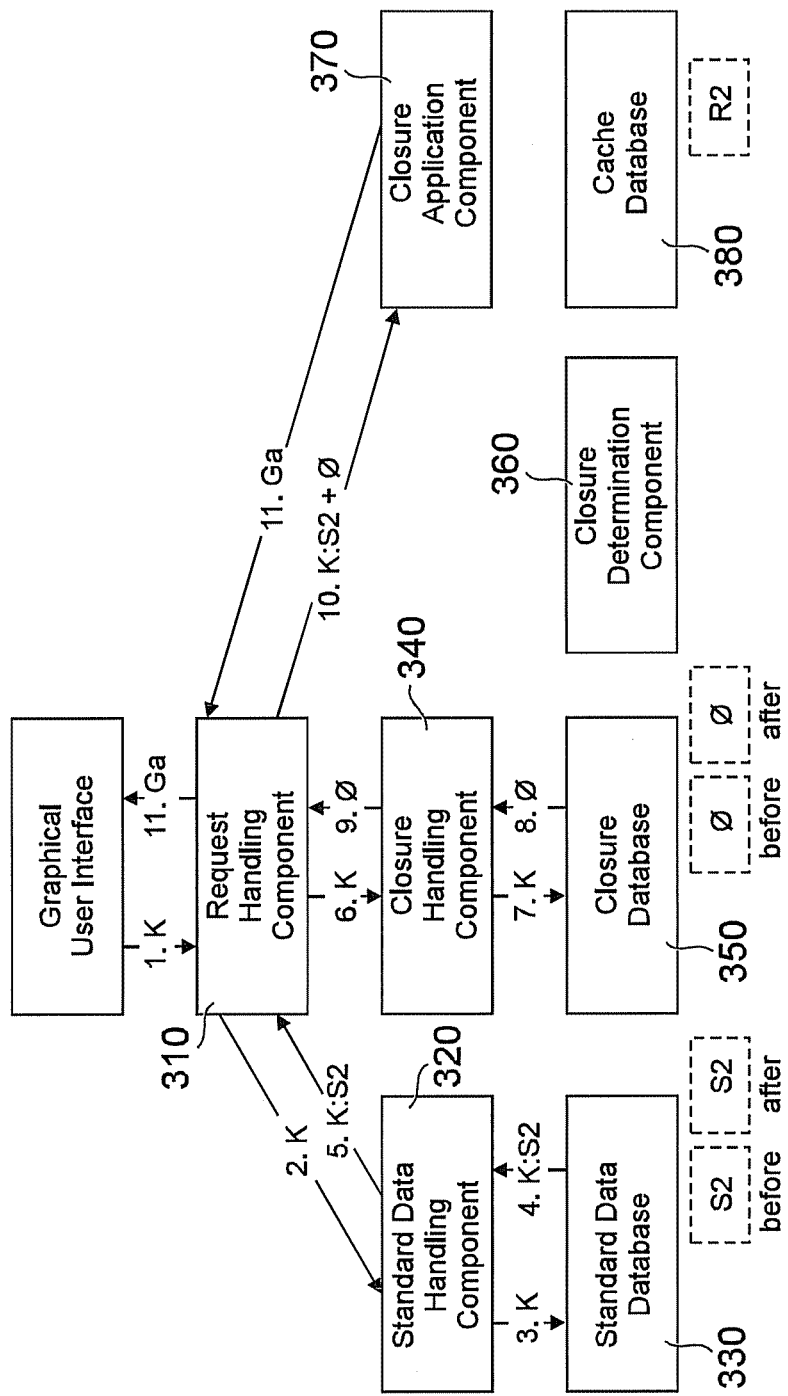
FIG. 4 is a schematic representation of a third example of the operations of the system of FIG. 1, in accordance with an embodiment of the invention, given by way of example.
Figure 5:
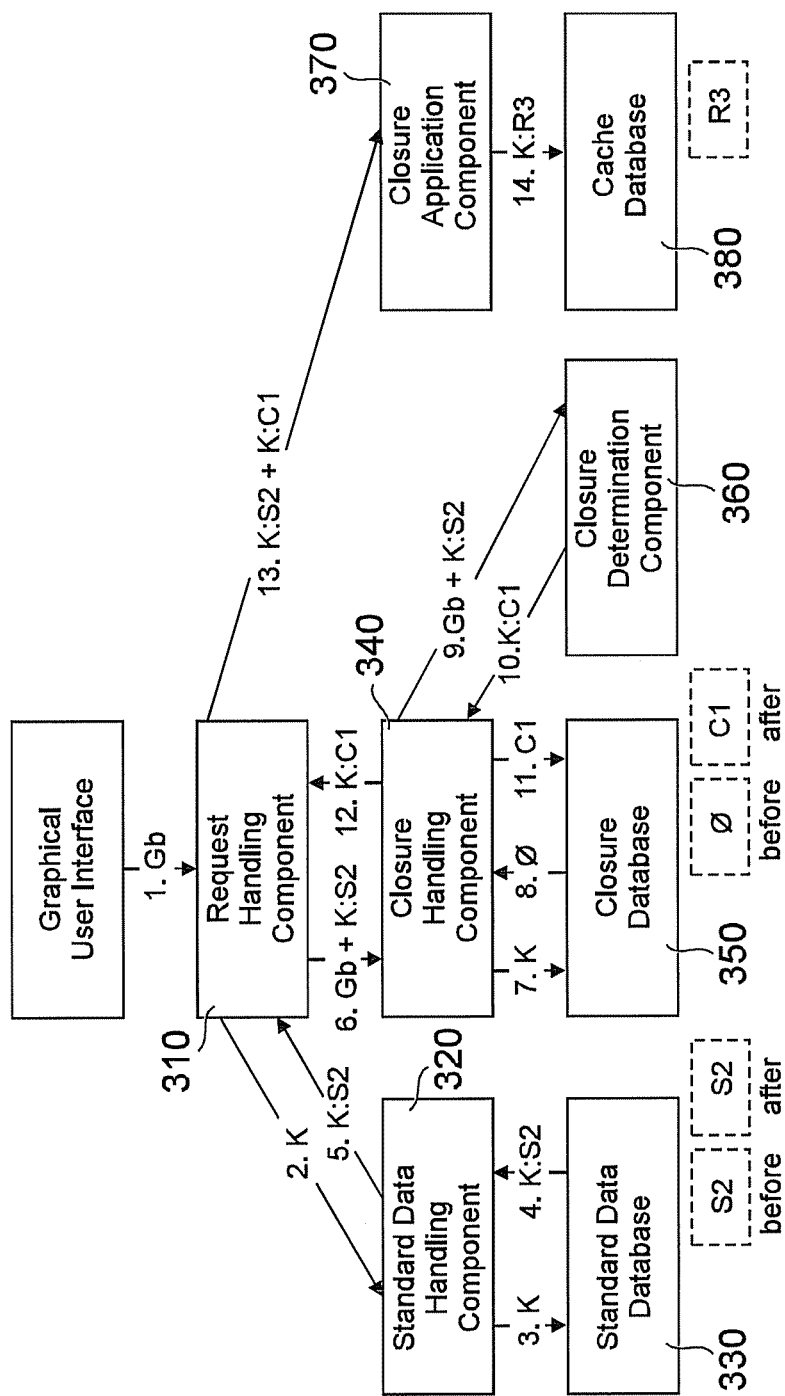
FIG. 5 is a schematic representation of a fourth example of the operations of the system of FIG. 1, in accordance with an embodiment of the invention, given by way of example.

FIG. 4 relates to a display of data K requested by the user for later updating data K as shown in FIG. 5. The user sends a display request to the proprietary filing system 300 by using a Graphical User Interface (GUI) for displaying the current data K. The request handling component 310 receives the display request in step 1 and transmits the request to the standard data handling component 320 in step 2. Upon reception of the display request, the standard data handling component 320 carries out a search in the standard data database 330 to retrieve the most recent version of the data K that exists in step 3. The standard data handling component 310 retrieves the version S2 and sends back S2 to the request handling component 310 in step 4. The standard data handling component 320 sends S2 to the request handling component 310 in step 5. The request handling component 310 then sends a request to the closure handling component 340 in step 6. The closure handling component 340 carries out a search in the closure database 350 to retrieve any stored closure associated with S2 having a key K in step 7. In the present example, the closure handling component 340 does not retrieve any stored closure in step 8 and sends this information to the request handling component 310 in step 9. Finally, the request handling component 310 sends both results received from the standard data handling component 320, i.e. S2; and from the closure handling component 340, i.e. no closure to the closure application component 370 in step 10. The closure application component 370 then applies any retrieved closure on the standard version S2 of data K to create a first data G to be displayed as Ga. As no closure was retrieved, the data Ga is identical to the version S2. The closure application component 370 then transmits the data Ga to the request handling component in step 11 for displaying Ga to the user by using the GUI in step 12.

FIG. 5 relates to an update request of data K requested by the user. The user sends an update request by using the GUI for sending a second data G being Gb associated with the previously displayed data Ga. The data Gb comprises S2 having the key K and an additional update part.

The request handling component 310 receives the update request in step 1 and transmits the update request to the standard data handling component 320 in step 2. Upon reception of the update request, the standard data handling component 320 carries out a search in the standard data database 330 to retrieve the most recent version of the standard data K in step 3. The standard data handling component 310 retrieves the standard data S2 and sends back S2 to the request handling component 310 in step 4. The standard data handling component 320 sends S2 to the request handling component 310 in step 5. The request handling component 310 then sends a request comprising the version S2 and the version Gb to the closure handling component 340 in step 6. The closure handling component 340 carries out a search in the closure database 350 to retrieve any stored closure associated with S2 having a key K in step 7. In the present example, the closure handling component 340 does not retrieve any stored closure in step 8. In addition, the closure handling component 340 compares the version Gb and the version S2 and determines that Gb and S2 are different versions. As a result, the closure, handling component 340 sends both version S2 and version Gb to the closure determination component 360 in a step 9. The closure determination component 360 processes a comparison between the version S2 and the version Gb to build a closure C1 showing the differences between S2 and Gb. The closure determination component 360 then determines the function and the nature of the data based on the difference between S2 and Gb. The closure determination component 360 then transmits the closure C1 to the closure handling component 340 in step 10, the closure being associated with data K. The closure handling component 340 then sends the closure C1 to the closure database 350 for storing in step 11. The closure handling component 340 also sends the closure C1 associated with data K to the request handling component 310 in step 12. The request handling component 310 then transmits both results received from the standard data handling component 320 i.e. S2; and from the closure handling component 340, i.e. C1 to the closure application component 370 in step 13. The closure application component 370 then applies the closure C1 on the version S3 of data K to create a resulting data R3 reflecting the version Gb from the user. The closure application component 370 then transmits R3 to the cache database 380 for storing R3 in step 14.

Figure 6:
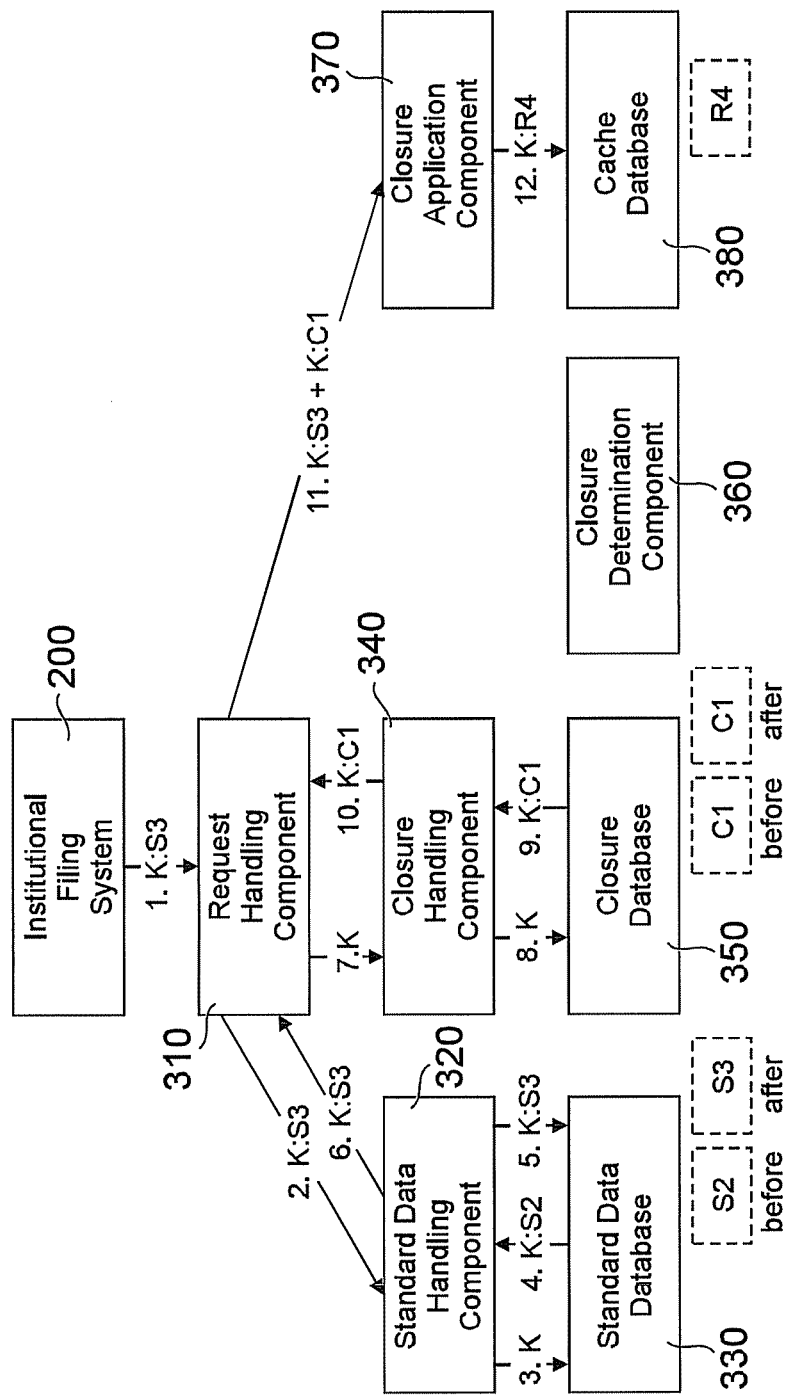
FIG. 6 is a schematic representation of a fifth example of the operations of the system of FIG. 1, in accordance with an embodiment of the invention, given by way of example.

FIG. 6 relates to an update of data K with a third version S3 from the institutional filing system 200. The user sends a request to the institutional filing system 200 for creating an update S3 comprising a sequence SQ3.

Thus, the user sends a fourth version S3, which comprises the same key K as the data K and an updated sequence SQ3 differing from SQ2. During the predetermined replication process, the transmission component 230 sends the version S3 to the request handling component 310 in step 1. The request handling component 310 transmits the update request to the standard data handling component 320 in step 2. The standard data handling component 320 carries out a search in the standard data database 330 of the proprietary filing system 300 for retrieving the previously stored version of data K having the same key K as S3. As S3 is an updated version of S2, the standard data handling component 310 retrieves S2 as being the most recent standard data having the key K in the standard data database 330 in step 4. The standard data handling component 320 then sends the updated data S3 to the standard data database 330 for storing S3 in step 5. The standard data handling component 320 also sends S3 to the request handling component 310 in step 6. In step 7, the request handling component 310 then sends a request to the closure handling component 340 to carry out a search in the closure database 350 to retrieve any stored closure associated with S2. The closure handling component 340 carries out the search in step 8. In the present example, the closure handling component 340 retrieves the previously stored closure C1 in step 9. The closure handling component 340 then sends the closure C1 to the request handling component 310 in step 10. Finally, in step 11 the request handling component 310 sends both the result received from the standard data handling component 320, i.e. S3; and the result received from the closure handling component 340, i.e. C1 to the closure application component 370. The closure application component 370 then applies the retrieved closure C1 on the standard version S2 of data K to create the resulting data R4. The closure application component 370 then transmits the resulting data R4 to the cache database 380 for storing the resulting data R4 in step 12.

Figure 7:
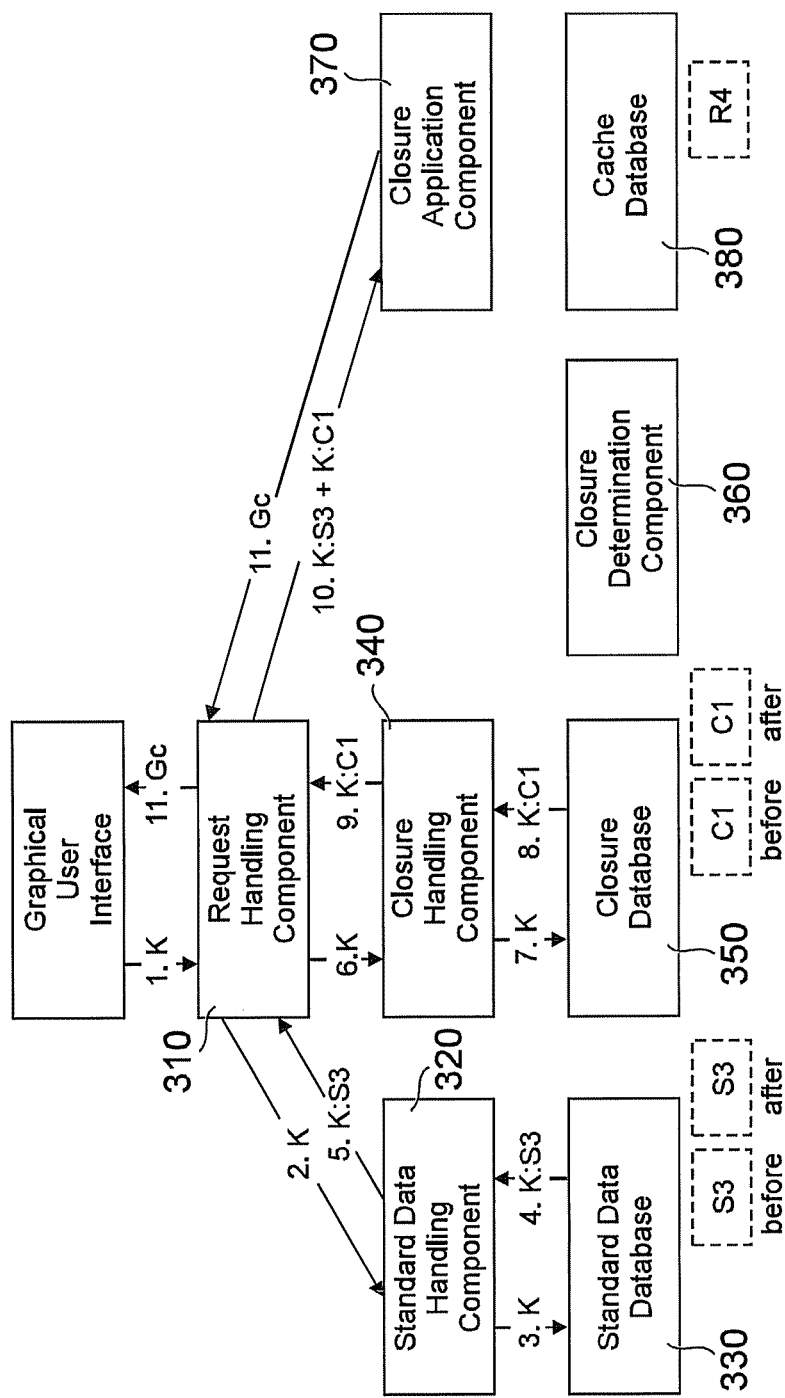
FIG. 7 is a schematic representation of a sixth example of the operations of the system of FIG. 1, in accordance with an embodiment of the invention, given by way of example.
Figure 8:
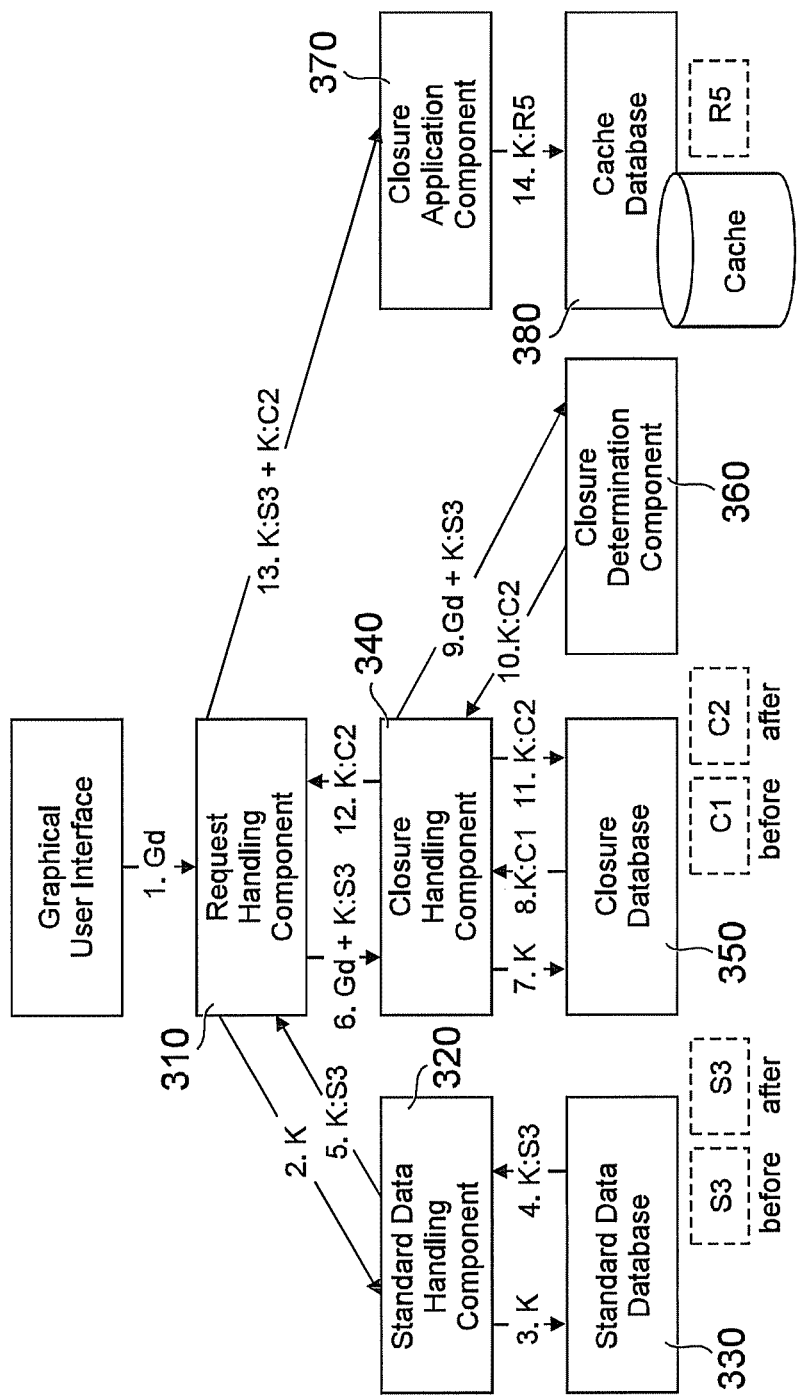
FIG. 8 is a schematic representation of a seventh example of the operations of the system of FIG. 1, in accordance with an embodiment of the invention, given by way of example.

FIG. 7 relates to a display of data K requested by the user for later updating data K as shown in FIG. 8. The user sends a display request to the proprietary filing system 300 by using a Graphical User Interface (GUI) for displaying the current data K.

The request handling component 310 receives the display request in step 1 and transmits the request to the standard data handling component 320 in step 2. Upon reception of the display request, the standard data handling component 320 carries out a search in the standard data database 330 to retrieve the most recent version of the standard data K in step 3. The standard data handling component 310 retrieves the standard data S3 and sends back S3 to the request handling component 310 in step 4. The standard data handling component 320 sends S3 to the request handling component 310 in step 5. The request handling component 310 then sends a request to the closure handling component 340 in step 6. The closure handling component 340 carries out a search in the closure database 350 to retrieve any stored closure associated with S3 having a key K in step 7. In the present example, the closure handling component 340 retrieves the stored closure C1 in step 8 and sends this information to the request handling component 310 in step 9. Finally, the request handling component 310 sends both the result received from the standard data handling component 320, i.e. S3 and the result received from the closure handling component 340, i.e. C1 to the closure application component 370 in step 10. The closure application component 370 then applies the closure C1 on the standard version S3 of data K to create a third data G to be displayed as Gc. The data Gc then comprises the version S3 and the closure C1. The closure application component 370 then transmits the data Gc to the request handling component in step 11 for displaying Gc to the user by using the GUI in step 12.

FIG. 8 relates to an update request of data K requested by the user. The user sends an update request by using the GUI for sending a fourth data Gd associated with the previously displayed data Gc. The data Gd comprises S3 having the key K and an additional update part.

The request handling component 310 receives the update request in step 1 and transmits the update request to the standard data handling component 320 in step 2. Upon reception of the update request, the standard data handling component 320 carries out a search in the standard data database 330 to retrieve any most recent version of the standard data K in step 3. The standard data handling component 310 retrieves the version S3 and sends back S3 to the request handling component 310 in step 4. The standard data handling component 320 sends S3 to the request handling component 310 in step 5. The request handling component 310 then sends a request comprising the version S3 and the version Gd to the closure handling component 340 in step 6. The closure handling component 340 carries out a search in the closure database 350 to retrieve any stored closure associated with S3 having a key K in step 7. In the present example, the closure handling component 340 retrieves the previously stored closure C1 in step 8. In addition, the closure handling component 340 compares the version Gd and the version S3 and determines that Gd and S3 are different versions. As a result, the closure handling component 340 sends both version S3 and version Gd to the closure determination component 360 in a step 9. The closure determination component 360 processes a comparison between the version S3 and the version Gd to build a closure C2 showing the difference between S3 and Gd. The closure determination component 360 then determines the function and the nature of the data based on the difference between S3 and Gd. The closure determination component 360 then transmits the closure C2 to the closure handling component 340 in step 10, the closure being associated with data K. The closure handling component 340 then sends the closure C2 to the closure database 350 for storing in step 11. The closure handling component 340 also sends the closure C2 associated with data K to the request handling component 310 in step 12. The request handling component 310 then transmits both results received from the standard data handling component 320 i.e. S3; and from the closure handling component 340, i.e. C2 to the closure application component 370 in step 13. The closure application component 370 then applies the closure C2 on the version S3 of data K to create a resulting data R5 reflecting the version Gd from the user. The closure application component 370 then transmits R5 to the cache database 380 for storing R5 in step 14.

In the above examples, data such as fare data may comprise several sequences. Each sequence then represents a refinement of the key K and thus defines additional information related to the key K such as the currency used or the route to be taken. A closure can relate to a single field of a single sequence for a given period of time. As a result, the resulting data after applying the closure is the result of the intersection of both the date of the standard data and the date of the closure and the application of the closure during a period of time when the closure is applicable.

Figure 9:
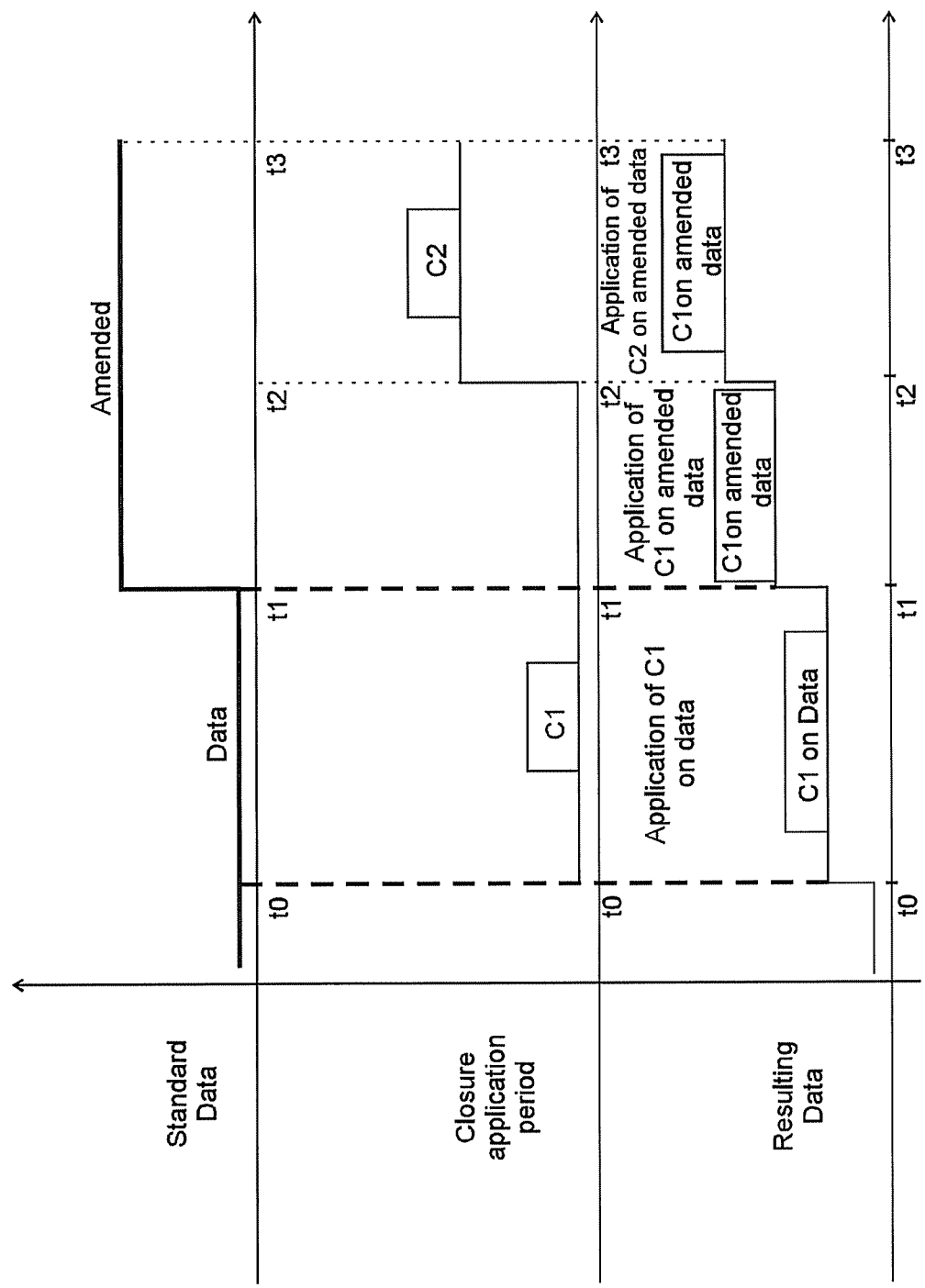
FIG. 9 is a schematic representation of date management, in accordance with an embodiment of the invention, given by way of example.

As shown in FIG. 9, a standard data comprising a data part and an amended data part can exist during a period of time from t0 to t3. The data part exists during a first period of time from t0 to t1 and the amended data exists during a second period of time from t1 to t3. Two closures C1 and C2 relating to the standard data apply during the same period of time t0 to t3 as for the existence of the standard data. The closure C1 can be applied during a first period of time from t0 to t2 with t2 being located between t1 and t3. The closure C2 can be applied during a second period of time from t2 to t3. This means that the application of both closures on the standard data comprising two applications on two different periods of time. The application of the closure C1 occurs on the standard data over a period of time from t0 to t2, which is the duration of the closure C1. As the data part of the standard data exists over a period of time from t0 to t1 only, the closure C1 applies on this data part. As the amended data part exists over a period of time from t1 to t3, the closure C1 only applies on the amended data part over a period of time covering the corresponding period of time for the closure C1. This means that the closure C1 partially apply on the amended data part over a period of time from t1 to t2. This means that both the data part and the amended data part of the standard data are impacted by the application of the closure C1. The application of the closure C2 occurs on the standard data over a period of time from t2 to t3, which is the duration of the closure C2. As the amended data part exists over a period of time from t1 to t2 and from t2 to t3, this means that only the amended data part of the standard data is impacted by the application of the closure C2.

Figure 10:
FIG. 10 is a schematic representation of renumbering sequences, in accordance with an embodiment of the invention, given by way of example.

Another embodiment is shown in FIG. 10 to illustrate the sequence renumbering function from the institutional filing system 200. In FIG. 10, the institutional filing system 200 sends an update relating to two sequences 1 and 2 in step 1. As a result, the standard data comprises two sequences 1 and 2 and is stored in the standard data database 330. As shown in FIG. 10, in step 1 the closure database 350 does not contain any closure. As a result, there is no closure to apply on the standard data from the closure database 350. The cache database 380 can thus store the standard data comprising the same sequences 1 and 2 as the resulting data.

In step 2, the user sends an update to the proprietary filing system 300. The update comprises a closure C1 associated with the sequence 1. The closure database 350 then stores the closure C1. The cache database 380 stores the standard data having the sequence 1 with the closure C1 applied thereon and the sequence 2 without any amendment. In step 3, the institutional filing system 200 requests a sequence renumbering as an amendment provided to the standard data. The request comprises the renumbering of sequence 1 into sequence 4 for the standard data. This means that the standard data now comprises two sequences 2 and 4 as shown in FIG. 10. The closure handling component 340 renumbers the closure C1 and associates it to the sequence 4. The closure database 350 stores the updated version of C1. The closure database 350 then associates the stored closure C1 with the sequence 4. The cache database 380 stores the standard data having the sequence 2 as stored in step 2 and reorder the sequence 4 with the closure C1 applied thereon.

The above examples relate to updating and storing changes to travel data. However, the present invention can also relate to other kinds of data. The above examples relate to fares and pricing applications. However, the present invention could also relate to other kinds of applications.

This invention has been applied to the update of data in the travel environment. However, it will be appreciated that the invention may apply to other environments, for example in the domain of pricing and/or booking engines (hotels, cars, and trains), fret, e-shopping (Amazon™, Darty™, etc).

It will be appreciated that this invention may be varied in many different ways and still remain within the intended scope of the invention.

In one exemplary implementation, the subject matter described herein can be implemented using a non-transitory computer readable medium having stored thereon a computer program comprising instructions for carrying out any of the methods described herein. For example, any of the components and engines described herein may be implemented in software embodied in a non-transitory computer readable medium and executed by a processor. Each of the databases described herein may also be embodied in a non-transitory computer readable medium. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or a computing platform or may be distributed across plural devices or computing platforms.

A person skilled in the art will understand that some or all of the functional entities as well as the processes themselves may be embodied in software, or one or more softwareenabled modules and/or devices or in any combination thereof. The software may operate on any appropriate computer or other machine. The operation of the invention provides a number of transformations such as adding specific data to standard data to provide resulting data.

The invention claimed is:

1. A method for maintaining data in a second data system, the method comprising:

storing a first version of standard data in a standard data database for the second data system, wherein the first version of the standard data is additionally maintained in a first data system, wherein the first data system is an institutional filing system related to a plurality of travel fare providers, wherein the second data system is a proprietary filing system related to a travel provider, and wherein the first version of the standard data comprises a key and a first sequence associated with the key;

after an update of the standard data to a second version in the first data system, receiving in the second system a first request from the first data system to update the standard data stored in the standard database to the second version, and in response to receiving the first request, updating the standard data stored in the standard data database to the second version by associating a second sequence with the key in the standard data database;

after updating the standard data stored in the standard data database to the second version, receiving a second request from a user to modify the standard data stored in the standard data database in the second data system, and in response to receiving the second request:

comparing updated data associated with the second request with the second sequence associated with the second version of the standard data stored in the standard data database to determine a change therein;

producing an operating function representative of the change and associated with the key; and storing the operating function in an operating function database;

after storing the operating function in the operating function database:

searching the standard data database based on the key to retrieve the second version of the standard data associated with the key;

searching the operating function database based on the key to retrieve the operating function associated with the key; and applying the operating function to apply the change to the second sequence associated with the second version of the standard data retrieved from the standard data database to produce a resulting data to store in a cache database as a most recent version of data related to the standard data; and sending the resulting data to a pricing engine for use in generating a travel fare.

2. The method of claim 1, wherein the first request is initiated by the first data system in connection with a regular replication process that replicates standard data from the first data system to the second data system.

3. The method of claim 2, wherein the standard data comprises a standard travel product including one or more of a fare, a rule or a branded fare.

4. The method of claim 3, wherein the second request modifies the standard data to add specific data, wherein the specific data comprises one or more of a dynamic discounted fare, an add-on zone or baggage.

5. The method of claim 1, wherein searching the standard data database, searching the operating function, and applying the operating function are performed in response to the second request, the method further comprising storing the resulting data in the cache database.

6. The method of claim 1, wherein searching the standard data database, searching the operating function database, and applying the operating function are performed in response to a third request, the method further comprising returning the resulting data as a response to the third request.

7. The method of claim 6, further comprising, after returning the resulting data, receiving a fourth request updating the resulting data, and in response to receiving the fourth request:

accessing the standard data database to retrieve a current version of the standard data;

comparing updated resulting data associated with the fourth request with the current version of the standard data stored in the standard data database to determine a change therein;

producing a second operating function representative of the change;

applying the second operating function to the current version of the standard data to produce second resulting data; and storing the second resulting data in the cache database.

8. A system, comprising:

at least one processor; and computer program instructions configured upon execution by the at least one processor to maintain data in a second data system by:

storing a first version of standard data in a standard data database for the second data system, wherein the first version of the standard data is additionally maintained in a first data system, wherein the first data system is an institutional filing system related to a plurality of travel fare providers, wherein the second data system is a proprietary filing system related to a travel provider, and wherein the first version of the standard data comprises a key and a first sequence associated with the key;

after an update of the standard data to a second version in the first data system, receiving in the second system a first request from the first data system to update the standard data stored in the standard database to the second version, and in response to receiving the first request, updating the standard data stored in the standard data database to the second version by associating a second sequence with the key in the standard data database;

after updating the standard data stored in the standard data database to the second version, receiving a second request from a user to modify the standard data stored in the standard data database in the second data system, and in response to receiving the second request:

comparing updated data associated with the second request with the second sequence associated with the second version of the standard data stored in the standard data database to determine a change therein;

producing an operating function representative of the change and associated with the key; and storing the operating function in an operating function database;

after storing the operating function in the operating function database:

searching the standard data database based on the key to retrieve the second version of the standard data associated with the key;

searching the operating function database based on the key to retrieve the operating function associated with the key; and applying the operating function to apply the change to the second sequence associated with the second version of the standard data retrieved from the standard data database to produce a resulting data to store in a cache database as a most recent version of data related to the standard data; and sending the resulting data to a pricing engine for use in generating a travel fare.

9. The system of claim 8, wherein the first request is initiated by the first data system in connection with a regular replication process that replicates standard data from the first data system to the second data system.

10. The system of claim 9, wherein the standard data comprises a standard travel product including one or more of a fare, a rule or a branded fare.

11. The system of claim 10, wherein the second request modifies the standard data to add specific data, wherein the specific data comprises one or more of a dynamic discounted fare, an add-on zone or baggage.

12. The system of claim 8, wherein the computer program instructions are configured to search the standard data database, search the operating function database, and apply the operating function in response to the second request, and wherein the computer program instructions are further configured to store the resulting data in the cache database.

13. The system of claim 8, wherein the computer program instructions are configured to search the standard data database, search the operating function database, and apply the operating function in response to a third request and wherein the computer program instructions are further configured to return the resulting data as a response to the third request.

14. The system of claim 13, wherein the computer program instructions are further configured to, after returning the resulting data, receive a fourth request updating the resulting data, and in response to receiving the fourth request:

access the standard data database to retrieve a current version of the standard data;

compare updated resulting data associated with the fourth request with the current version of the standard data stored in the standard data database to determine a change therein;

produce a second operating function representative of the change;

apply the second operating function to the current version of the standard data to produce second resulting data; and store the second resulting data in the cache database.

15. A non-transitory computer readable medium having stored thereon computer program instructions configured upon execution by at least one processor to maintain data in a second data system by:

storing a first version of standard data in a standard data database for the second data system, wherein the first version of the standard data is additionally maintained in a first data system, wherein the first data system is an institutional filing system related to a plurality of travel fare providers, wherein the second data system is a proprietary filing system related to a travel provider, and wherein the first version of the standard data comprises a key and a first sequence associated with the key;

after an update of the standard data to a second version in the first data system, receiving in the second system a first request from the first data system to update the standard data stored in the standard database to the second version, and in response to receiving the first request, updating the standard data stored in the standard data database to the second version by associating a second sequence with the key in the standard data database;

after updating the standard data stored in the standard data database to the second version, receiving a second request from a user to modify the standard data stored in the standard data database in the second data system, and in response to receiving the second request:

comparing updated data associated with the second request with the second sequence associated with the second version of the standard data stored in the standard data database to determine a change therein;

producing an operating function representative of the change and associated with the key; and storing the operating function in an operating function database;

after storing the operating function in the operating function database:

searching the standard data database based on the key to retrieve the second version of the standard data associated with the key;

searching the operating function database based on the key to retrieve the operating function associated with the key; and applying the operating function to apply the change to the second sequence associated with the second version of the standard data retrieved from the standard data database to produce a resulting data to store in a cache database as a most recent version of data related to the standard data; and sending the resulting data to a pricing engine for use in generating a travel fare.

16. The non-transitory computer readable medium of claim 15, wherein the first request is initiated by the first data system in connection with a regular replication process that replicates standard data from the first data system to the second data system.

17. The non-transitory computer readable medium of claim 16, wherein the standard data comprises a standard travel product including one or more of a fare, a rule or a branded fare.

18. The non-transitory computer readable medium of claim 17, wherein the second request modifies the standard data to add specific data, wherein the specific data comprises one or more of a dynamic discounted fare, an add-on zone or baggage.

19. The non-transitory computer readable medium of claim 15, wherein the computer program instructions are configured to search the standard data database, search the operating function database, and apply the operating function in response to the second request, and wherein the computer program instructions are further configured to store the resulting data in the cache database.

20. The non-transitory computer readable medium of claim 15, wherein the computer program instructions are configured to search the standard data database, search the operating function database, and apply the operating function in response to a third request and wherein the computer program instructions are further configured to return the resulting data as a response to the third request.

21. The non-transitory computer readable medium of claim 20, wherein the computer program instructions are further configured to, after returning the resulting data, receive a fourth request updating the resulting data, and in response to receiving the fourth request:
- access the standard data database to retrieve a current version of the standard data;
- compare updated resulting data associated with the fourth request with the current version of the standard data stored in the standard data database to determine a change therein;
- produce a second operating function representative of the change;
- apply the second operating function to the current version of the standard data to produce second resulting data; and
- store the second resulting data in the cache database.

* * * * *

UNITED STATES PATENT AND TRADEMARK OFFICE
CERTIFICATE OF CORRECTION

PATENT NO. : 8,700,565 B2
APPLICATION NO. : 13/351977
DATED : April 15, 2014
INVENTOR(S) : David-Olivier Saban et al.

It is certified that error appears in the above-identified patent and that said Letters Patent is hereby corrected as shown below:

In the Claims:

At column 12, claim number 5, line number 2, after "function" insert --database--

Signed and Sealed this
Eighth Day of July, 2014

Michelle K. Lee
*Deputy Director of the United States Patent and Trademark Office*